June 8, 1965  P. H. SETZLER  3,187,474

MOLD FINISHING PROCESS

Filed May 9, 1962

INVENTOR.
Paul H. Setzler
BY
Dorris, McDougall & Hersh
Attys

1

3,187,474
MOLD FINISHING PROCESS
Paul H. Setzler, York, Pa., assignor, by mesne assignments, to The Wheelabrator Corporation, Mishawaka, Ind., a corporation of Delaware
Filed May 9, 1962, Ser. No. 193,482
1 Claim. (Cl. 51—313)

This invention relates to a process for finishing molds. In particular, the invention is concerned with an improved system for treating the molding surfaces of metal molds in order to provide a highly satisfactory finish.

In the production of metallic molds, casting techniques are generally employed, and it is well known that the as-cast product is not suitable for molding operations which require some precision and a reasonably good surface finish in the molded product. Thus, the molding surfaces of the cast molds are generally rough and require considerable cleaning. In the case of cast iron molds, it is common to find that free graphite has burned out in use where glass is being molded. This surface is no longer smooth enough to produce good glass, and the mold must be refinished.

To the present, the only satisfactory methods for cleaning the molding surfaces of metallic molds have involved hand polishing. This is particularly true in the case of molds which have intricate portions, since mechanical methods have either failed to reach these portions for cleaning or have damaged these portions as by rounding of the corners, thus making the molds unsuitable for use.

It will be appreciated that hand polishing techniques are subject to many disadvantages. Operations of this type are extremely time consuming and the time and labor expenditures comprise a large percentage of the cost of the molded products. Moreover, there is a constant possibility of human error which may require scrapping of an expensive mold with consequent loss of all preceding work, or which may result in imperfect molded articles if the defect is not immediately detected. It has also been observed that even where the greatest care is taken, certain molds which have extensive patterns or convolutions over the molding surfaces can seldom be finished to any degree of uniformity. Thus, hand polishing invariably results in differences in such surfaces due to variations in intensity by the worker.

It is an object of this invention to provide an improved mold finishing technique which will result in a highly satisfactory mold finish but which eliminates laborious hand polishing operations.

It is a more particular object of this invention to provide a system for the finishing of metallic molds whereby the molds will be suitable for the production of precision articles with high surface quality.

It is an additional object of this invention to provide a system capable of achieving the foregoing objects which can be employed in conjunction with the production of molds utilized in the molding of glass, rubber, plastic, powdered metal and other articles.

These and other objects of this invention will appear hereinafter and, for purposes of illustration, but not of limitation, specific embodiments of this invention are shown in the accompanying drawings in which—

The present invention provides a mold finishing operation which is to be employed in conjunction with the production of molds to be used in the manufacture of molded articles. In the production of such molds by casting techniques, or contour milling, such as on a Keller tracing mill, foreign substances, such as scale, free graphite, etc., are formed on the molding surfaces. The present invention provides for treatment of the molds in the as-cast or machined condition. The invention thus overcomes previous difficulties arising due to the fact that a cast mold could not be made accurate enough, nor could a mold be machined smoothly enough for use.

The treatment of this invention necessitates the use of a container which is adapted to be vibrated. A finishing material is included in the container along with the mold section which is to be treated. The finishing material, when in contact with the molding surfaces during vibration of the container, is adapted to remove any foreign substances from the molding surfaces and polish them. It has been found that the inclusion of this technique into a mold producing operation provides many advantages, including quality of the finish on the molding surfaces and efficiency of operation. A polish of from 3 to 5 R.M.S. is possible with this invention.

The finishing material employed in the treating process may comprise various abrasive or non-abrasive mediums which are adapted to mechanically remove the foreign material from the molding surfaces during the vibrating operation. On the other hand, various abrasive or non-abrasive chemicals or chemical compounds which are adapted to react to remove the foreign substances during the vibrating operation are also contemplated.

Vibrating machines which are preferably employed in the practice of this invention are disclosed in the Brandt Patents Nos. 2,997,813 and 2,997,814, issued August 29, 1961. Generally, machines of the type set forth in these patents comprise a frame structure mounting a vibratory bowl or container adapted to hold a finishing medium. Means are provided for vibrating the frame structure and associated container. These means may include an eccentrically journalled rotary weight suspended from the container whereby driving means rotating the weight will impart vibratory movement to the container and to the finishing material therein. On the other hand, the patents referred to contemplate a first means for imparting vibratory displacements to a similarly mounted container while a second resilient means cooperates with the vibrating means to provide a unique movement of the container.

Figure 1:
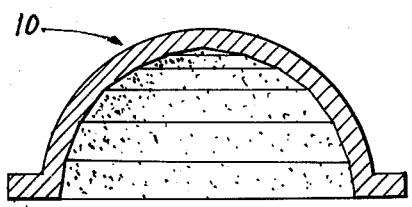
FIGURE 1 is a schematic cross-sectional view of a typical mold section adapted to be treated in accordance with this invention.

The accompanying drawings illustrate in FIGURE 1 a mold section 10 in the as-cast or machined condition which is adapted to be cleaned and finished in accordance with this invention. The mold section is designed for use in the production of a glass globe and the pattern produced in the mold surface provides a good example of a surface which is difficult to finish uniformly by hand methods. It will be appreciated, however, that the concepts of this invention are applicable to a wide variety of other mold designs.

Figure 2:
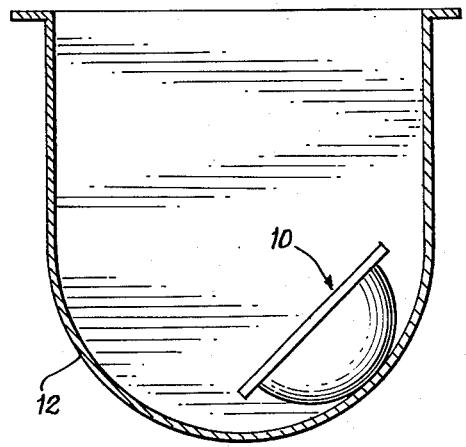
FIGURE 2 is a schematic cross-sectional view of a vibratory bowl and mold section to be treated therein.
Figure 3:
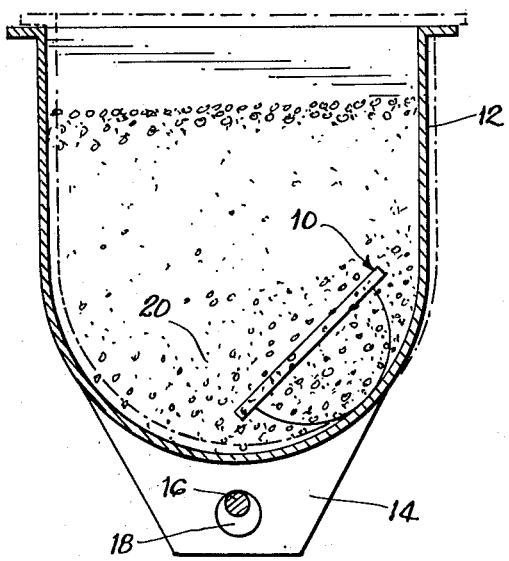
FIGURE 3 is a schematic cross-sectional view of a vibratory bowl and vibrating means therefor, also illustrating a mold section associated with material comprising a finishing medium.
Figure 4:
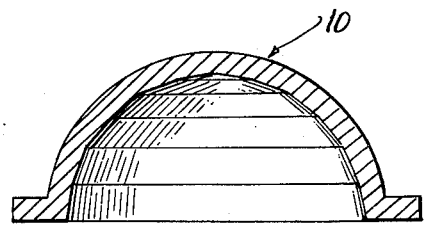
FIGURE 4 is a schematic cross-sectional view of a mold section after treatment in accordance with this invention.

FIGURES 2 and 3 illustrate a bowl 12 which is adapted to be associated with a vibrating machine whereby the mold sections 10 can be suitably finished. One means for vibration of the bowl is shown in part in FIGURE 3. This means, as described in the aforementioned Brandt Patent No. 2,997,814, includes a member 14 connected to the bowl 12 which provides one journal for the shaft 16. A similar member 14 (not shown) is located at the opposite end of the bowl for journalling the shaft 16, and an eccentric weight 18 is mounted on the shaft intermediate the members 14. Means located externally of the structure illustrated are provided for imparting a rotary driving force to the shaft 16. The rotation of the eccentric weight 18 will, in turn, impart vibratory movement to the bowl 12.

In some instances, where particularly large molds are treated, the molds may be bolted or otherwise fixed within the bowl. The medium within the bowl is adapted to contact the molding surfaces even though these surfaces are stationary with respect to the bowl.

The material 20 which comprises the finishing medium is disposed within the bowl 12 along with a mold section 10. Vibration of the bowl will continue until a satisfactory surface condition is provided on the mold section.

As previously indicated, the finishing medium may comprise an abrasive or non-abrasive material which is adapted to mechanically or chemically remove foreign material from the molding surfaces of a mold section. Metallic abrasive materials, including conventional shot and grit, are thus contemplated. Furthermore, the various abrasive and non-abrasive materials commonly used in tumbling operations, for example, fused aluminum oxide chips, are also suitable. It will be appreciated that one skilled in the art will be able to select a suitable medium from the wide variety available and that the nature of the medium as well as the mold surface condition will determine the intensity and extent of a particular finishing operation.

It has surprisingly been found that the described technique is capable of producing finishes which are superior to finishes produced by hand polishing. This has been found true both from the standpoint of quality of the finished surface as well as from the standpoint of efficiency and economy of the operation. Thus, the described process can produce more satisfactory finishes with greater uniformity and with less expenditure of time and money.

The uniformity which can be achieved is particularly apparent when considering the results with mold sections which have patterns formed in the molding surfaces. For example, in the case of mold sections used for the production of glass light globes, the patterns formed in the surfaces are made up of repeated, uniformly dimensioned, relatively small portions. Where hand polishing is employed for such molds, there are invariably portions where the polishing intensity is greater than in other portions. Accordingly, areas of non-uniformity appear in the molding surfaces and, therefore, in the molded articles. With the use of the technique of this invention, the possibility of intensity variations across the molding surfaces is materially reduced.

The technique of this invention has found particular application as a portion of a mold production operation. Thus, the use of this technique immediately following conventional casting operations or machining operations for mold sections greatly increases the economy and speed of operation in the over-all mold production. It has also been found that the technique of this invention can be utilized for the finishing of molding surfaces which have for some reason deteriorated after use. Thus, the technique of this invention can be employed as a means for restoring a high quality surface finish in mold sections.

It will be understood that various modifications may be made in the above described method which provide the characteristics of this invention without departing from the spirit thereof, particularly as defined in the following claim.

I claim:

In the production of molds to be used in the manufacture of molded articles wherein said molds are formed of metal in a casting operation and are characterized by uneven molding surfaces defining patterns of repeated, relatively small portions with said portions intersecting at relatively sharp angles, and wherein the surfaces of said molds are rough or foreign substances or the like are present on the molding surfaces after the casting operation, the improvement comprising providing a bowl and vibrating means associated therewith, introducing a finishing material for said molding surfaces along with the mold into said bowl whereby said finishing material is in contact with the molding surfaces, and vibrating said bowl, said finishing material being adapted to remove said foreign substances from said surfaces and to polish said surfaces, and said vibrating continuing until said finishing material completes said removing and polishing.

References Cited by the Examiner

UNITED STATES PATENTS

| | | | |
|---|---|---|---|
| 1,063,478 | 6/13 | Uebersax | 51—313 |
| 2,748,549 | 6/56 | Tuttle | 51—164 X |
| 2,973,606 | 3/61 | Brandt | 51—163 |
| 2,997,814 | 8/61 | Brandt | 51—163 X |

LESTER M. SWINGLE, *Primary Examiner.*

JOHN C. CHRISTIE, J. SPENCER OVERHOLSER,
*Examiners.*